(12) United States Patent
Cui et al.

(10) Patent No.: US 11,527,095 B2
(45) Date of Patent: Dec. 13, 2022

(54) SENSING SUB-CIRCUIT, CIRCUIT, RECOGNITION METHOD, SENSOR, PANEL AND DEVICE (71) Applicant: BOE Technology Group Co., Ltd., Beijing (CN)

(72) Inventors: Liang Cui, Beijing (CN); Lei Wang, Beijing (CN); Yangbing Li, Beijing (CN); Yubo Wang, Beijing (CN); Xiufeng Li, Beijing (CN); Yuanyuan Ma, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/489,605

(22) Filed: Sep. 29, 2021

(65) Prior Publication Data
US 2022/0147729 A1 May 12, 2022

(30) Foreign Application Priority Data

Nov. 11, 2020 (CN) .......................... 202011254729.3

(51) Int. Cl.
G06V 40/13 (2022.01)
G06V 10/98 (2022.01)
G06F 3/043 (2006.01)

(52) U.S. Cl.
CPC .......... *G06V 40/1306* (2022.01); *G06F 3/043* (2013.01); *G06V 10/98* (2022.01)

(58) Field of Classification Search
CPC ..... G06V 40/1306; G06V 10/98; G06F 3/043
See application file for complete search history.

(56) References Cited

U.S. PATENT DOCUMENTS

| 2017/0285877 | A1* | 10/2017 | Hinger | G01N 29/26 |
| 2018/0046836 | A1* | 2/2018 | Hinger | G01S 7/52079 |
| 2021/0158002 | A1* | 5/2021 | Kitchens | G06V 40/1329 |
| 2021/0350099 | A1* | 11/2021 | Buchan | H04L 9/3231 |

* cited by examiner

*Primary Examiner* — Premal R Patel
(74) *Attorney, Agent, or Firm* — IPro, PLLC (57) ABSTRACT The present disclosure provides a fingerprint sensing sub-circuit, a fingerprint sensing circuit, a fingerprint recognition method, a sensor, a touch display panel and a display device. The fingerprint sensing sub-circuit includes an acoustic wave generation circuit and an acoustic wave reception circuit. The acoustic wave generation circuit is configured to generate an ultrasonic wave. The acoustic wave reception circuit is configured to collect a voltage signal, convert the voltage signal into a current signal, and output the current signal to a signal output end. The acoustic wave generation circuit and the acoustic wave reception circuit are separated from each other, so that the fingerprint sensing sub-circuit operates in a mode where a transmitting operation and a receiving operation are separated from each other.

17 Claims, 6 Drawing Sheets

SENSING SUB-CIRCUIT, CIRCUIT, RECOGNITION METHOD, SENSOR, PANEL AND DEVICE

CROSS-REFERENCE TO RELATED APPLICATION

This application claims a priority of the Chinese patent application No. 202011254729.3 filed on Nov. 11, 2020, which is incorporated herein by reference in its entirety.

TECHNICAL FIELD

The present disclosure relates to the field of display technology, in particular to a fingerprint sensing sub-circuit, a fingerprint sensing circuit, a fingerprint recognition method, a sensor, a touch display panel and a display device.

BACKGROUND

An ultrasonic fingerprint sensor is capable of emitting an ultrasonic wave and receiving an ultrasonic wave reflected by a fingerprint for fingerprint recognition. Usually, the ultrasonic fingerprint sensor includes a piezoelectric material layer and an upper electrode and a lower electrode arranged at two sides of the piezoelectric material layer respectively. When an alternating current (AC) voltage is applied to the upper electrode and the lower electrode, the piezoelectric material layer is deformed (or the piezoelectric material layer drives a substrate of an upper film layer and a substrate of a lower film layer to vibrate), thereby the ultrasonic wave is generated and transmitted. When the ultrasonic wave reflected by the fingerprint is propagated to the piezoelectric material layer, it is converted into an AC voltage. The lower electrode is configured to receive an output signal, and the fingerprint is recognized in accordance with the output signal.

In the related art, when the piezoelectric material layer in the ultrasonic fingerprint sensor is energized, the piezoelectric material layer vibrates and emits the ultrasonic wave. After the energization has been stopped, the vibration of the piezoelectric material layer cannot be stopped immediately, and residual vibration occurs. At this time, a signal-to-noise ratio of a received signal is seriously adversely affected by an introduced noise, thereby a detection result of the ultrasonic fingerprint sensor is seriously adversely affected.

SUMMARY

In a first aspect, the present disclosure provides in some embodiments a fingerprint sensing sub-circuit, including an acoustic wave generation circuit and an acoustic wave reception circuit. The acoustic wave generation circuit is electrically coupled to a signal input end, a resetting end and a first voltage end, and configured to receive an alternating current signal from the signal input end, and generate an ultrasonic wave in accordance with the alternating current signal under the control of a resetting signal from the resetting end. The acoustic wave reception circuit is electrically coupled to a second voltage end, the resetting end, a sampling signal end, a power source voltage end, a scanning control end and a signal output end, and configured to convert an echo signal formed after the ultrasonic wave is reflected by a fingerprint into a voltage signal, and output the voltage signal to the signal output end, or convert the voltage signal into a current signal and output the current signal to the signal output end under the control of the resetting signal, a sampling signal from the sampling signal end and a scanning control signal from the scanning control end.

In a possible embodiment of the present disclosure, the acoustic wave generation circuit includes an electro-acoustic conversion control circuit and an electro-acoustic conversion circuit. The electro-acoustic conversion control circuit is electrically coupled to the electro-acoustic conversion circuit, the resetting end and the first voltage end, and configured to enable the electro-acoustic conversion circuit to be electrically coupled to the first voltage end under the control of the resetting signal. The electro-acoustic conversion circuit is electrically coupled to the signal input end and the electro-acoustic conversion control circuit, and configured to receive the alternating current signal from the signal input end, and convert the alternating current signal into the ultrasonic wave when the electro-acoustic conversion circuit is electrically coupled to the first voltage end.

In a possible embodiment of the present disclosure, the electro-acoustic conversion control circuit includes a first transistor. A control electrode of the first transistor is electrically coupled to the resetting end, a first electrode of the first transistor is electrically coupled to the electro-acoustic conversion circuit, and a second electrode of the first transistor is electrically coupled to the first voltage end.

In a possible embodiment of the present disclosure, the acoustic wave reception circuit includes an acoustic-electrical conversion circuit, a sampling control circuit, a signal conversion circuit and an output control circuit. The acoustic-electric conversion circuit is electrically coupled to the second voltage end, the sampling control circuit and the signal conversion circuit, and configured to receive an echo signal formed after the ultrasonic wave is reflected by a fingerprint, and convert the echo signal into a voltage signal. The sampling control circuit is electrically coupled to the resetting end, the sampling signal end, the acoustic-electric conversion circuit and the signal conversion circuit, and configured to output the voltage signal to the signal conversion circuit under the control of the resetting signal and the sampling signal. The signal conversion circuit is electrically coupled to the sampling control circuit, the power source voltage end and the output control circuit, and configured to convert the voltage signal into a current signal and output the current signal to the output control circuit. The output control circuit is electrically coupled to the signal conversion circuit, the scanning control end and the signal output end, and configured to output the current signal to the signal output end under the control of the scanning control signal.

In a possible embodiment of the present disclosure, the sampling control circuit includes a second transistor. A control electrode of the second transistor is electrically coupled to the resetting end, a first electrode of the second transistor is electrically coupled to the acoustic-electric conversion circuit and the signal conversion circuit, and a second electrode of the second transistor is electrically coupled to the sampling signal end.

In a possible embodiment of the present disclosure, the signal conversion circuit includes a third transistor. A control electrode of the third transistor is electrically coupled to the first electrode of the second transistor, a first electrode of the third transistor is electrically coupled to the power source voltage end, and a second electrode of the third transistor is electrically coupled to the output control circuit.

In a possible embodiment of the present disclosure, the output control circuit includes a fourth transistor. A control electrode of the fourth transistor is electrically coupled to the scanning control end, a first electrode of the fourth transistor is electrically coupled to the second electrode of the third transistor, and a second electrode of the fourth transistor is electrically coupled to the signal output end.

In a second aspect, the present disclosure provides in some embodiments a fingerprint sensing circuit, including a plurality of resetting signal lines extending in a first direction, a plurality of sampling signal lines extending in the first direction, a plurality of signal reading lines extending in the first direction, a plurality of scanning signal lines extending in a second direction, and a plurality of the above-mentioned fingerprint sensing sub-circuits arranged in an array form. Each fingerprint sensing sub-circuit corresponds to a resetting end, a sampling signal end, a signal output end, a scanning control end, the resetting signal line, the sampling signal line, the signal reading line, and the scanning signal line. Each fingerprint sensing sub-circuit is electrically coupled to a corresponding resetting signal line through a corresponding resetting end, electrically coupled to a corresponding sampling signal line through a corresponding sampling signal end, electrically coupled to a corresponding signal reading line through a corresponding signal output end, and electrically coupled to a corresponding scanning signal line through a corresponding scanning control end.

In a third aspect, the present disclosure provides in some embodiments a sensor, including a substrate, and the above-mentioned fingerprint sensing circuit arranged on the substrate.

In a possible embodiment of the present disclosure, the fingerprint sensing circuit includes a circuit control layer arranged on the substrate. The fingerprint sensing sub-circuit includes an electro-acoustic conversion control circuit, an electro-acoustic conversion circuit, an acoustic-electric conversion circuit, a sampling control circuit, a signal conversion circuit and an output control circuit. The electro-acoustic conversion circuit includes a first electrode and a piezoelectric layer, and the acoustic-electric conversion circuit includes a second electrode and a piezoelectric layer. The electro-acoustic conversion control circuit, the sampling control circuit, the signal conversion circuit and the output control circuit are located at the circuit control layer, the second electrode is located at a side of the circuit control layer away from the substrate, the piezoelectric layer is located at a side of the second electrode away from the substrate, and the first electrode is located at a side of the piezoelectric layer away from the second electrode.

In a possible embodiment of the present disclosure, the first electrode is a strip-like electrode, and the second electrode is a block-like electrode, and an orthogonal projection of the first electrode onto the substrate does not overlap an orthogonal projection of the second electrode onto the substrate.

In a possible embodiment of the present disclosure, the piezoelectric layer has a strip-like shape, or an orthogonal projection of the piezoelectric layer onto the substrate covers the substrate.

In a fourth aspect, the present disclosure provides in some embodiments a touch display panel, including a display panel and the above-mentioned sensor arranged on, or built in, the display panel.

In a fifth aspect, the present disclosure provides in some embodiments a display device including the above-mentioned touch display panel.

In a sixth aspect, the present disclosure provides in some embodiments a fingerprint recognition method for the above-mentioned fingerprint sensing circuit, including: receiving, by an acoustic wave generation circuit in a fingerprint sensing sub-circuit of the fingerprint sensing circuit, a resetting signal from a corresponding resetting signal line, and generating, by the acoustic wave generation circuit, an ultrasonic wave toward a fingerprint; receiving, by an acoustic wave reception circuit in the fingerprint sensing sub-circuit, an echo signal formed after the ultrasonic wave is reflected by the fingerprint, and converting the echo signal into a voltage signal; receiving, by the acoustic wave reception circuit, the resetting signal and a sampling signal from a corresponding sampling signal line, and converting the voltage signal into a current signal; and receiving, by the acoustic wave reception circuit, a scanning control signal from a corresponding scanning signal line, outputting the current signal to a corresponding signal reading line, and recognizing the fingerprint in accordance with a magnitude of the current signal read by the signal reading line.

The above description is merely an overview of the schemes in the embodiments of the present disclosure, and the schemes may be implemented in accordance with contents involved in the description so as to enable a person skilled in the art to understand the technical means of the present disclosure in a clearer manner. In order to make the objects, the technical solutions and the advantages of the present disclosure more apparent, the present disclosure will be described hereinafter in a clear and complete manner in conjunction with the drawings and embodiments.

BRIEF DESCRIPTION OF THE DRAWINGS

Through reading the detailed description hereinafter, the other advantages and benefits will be apparent to a person skilled in the art. The drawings are merely used to show the preferred embodiments, but shall not be construed as limiting the present disclosure. In addition, in the drawings, same reference symbols represent same members. In these drawings.

REFERENCE SIGN LIST 1 fingerprint sensing sub-circuit
2 acoustic wave generation circuit
21 electro-acoustic conversion control circuit
22 electro-acoustic conversion circuit
3 acoustic wave reception circuit
31 acoustic-electric conversion circuit
32 sampling control circuit
33 signal conversion circuit
34 output control circuit
4 fingerprint sensing circuit
6 substrate
7 first electrode
8 piezoelectric layer
9 second electrode
10 upper electrode
11 lower electrode
12 piezoelectric material layer
13 fingerprint
14 circuit control layer

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. In addition, the expression "and/or" is used to indicate the existence of all or any one of one or more of listed items, or combinations thereof.

Unless otherwise defined, any technical or scientific term used herein shall have the common meaning understood by a person of ordinary skills. Any term defined in a commonly-used dictionary shall be understood as having the meaning in conformity with that in the related art, shall not be interpreted idealistically and extremely.

All transistors adopted in the embodiments of the present disclosure may be triodes, thin film transistors (TFT), field effect transistors (FETs) or any other elements having an identical characteristic. In order to differentiate two electrodes other than a control electrode from each other, one of the two electrodes is called as first electrode and the other is called as second electrode.

When the transistor is a triode, the control electrode may be a base, the first electrode may be a collector and the second electrode may be an emitter, or the control electrode may be a base, the first electrode may be an emitter and the second electrode may be a collector.

When the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

Figure 1:
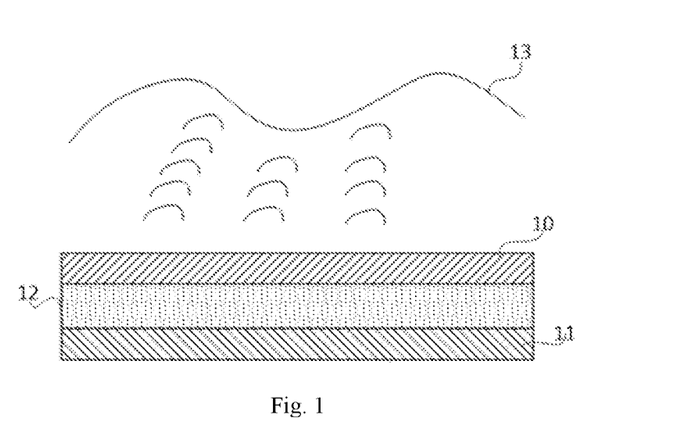
FIG. 1 is a schematic view of a principle of emitting an ultrasonic wave by a conventional ultrasonic fingerprint sensor.
Figure 2:
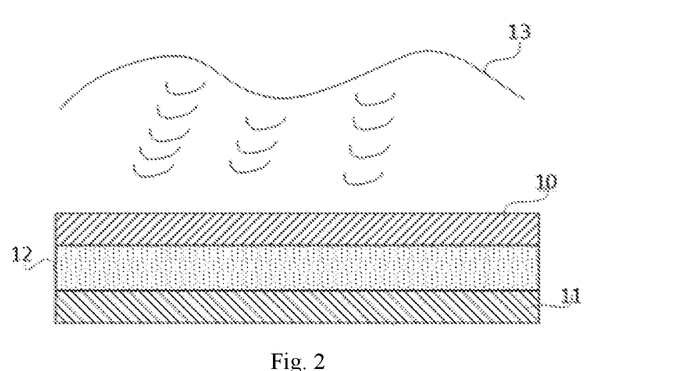
FIG. 2 is a schematic view of a principle of receiving an ultrasonic wave by the conventional ultrasonic fingerprint sensor.

Principles of generating and receiving an acoustic wave by a conventional ultrasonic fingerprint sensor will be described hereinafter in details with reference to FIGS. 1 and 2. As shown in FIGS. 1 and 2, a piezoelectric element of the conventional ultrasonic fingerprint sensor includes an upper electrode 10, a lower electrode 11, and a piezoelectric material layer 12 arranged between the upper electrode 10 and the lower electrode 11, i.e., the piezoelectric element has a sandwich-like structure.

As shown in FIG. 1, when the upper electrode 10 is grounded and the lower electrode 11 receives an AC voltage signal, the piezoelectric material layer 12 is deformed (or the piezoelectric material layer 12 drives a substrate of an upper film layer and a substrate of a lower film layer to vibrate), and then an acoustic wave is generated and transmitted. When there is a fingerprint above the upper electrode 10, the acoustic waves is propagated to the fingerprint 13. Generally, the piezoelectric material layer 12 is made of polyvinylidene fluoride (PVDF), or any other inorganic or organic piezoelectric material such as aluminum nitride (AlN), Pb-based zirconate titanate (PZT) or zinc oxide (ZnO).

As shown in FIG. 2, when the acoustic wave is reflected by the fingerprint 13 back to the piezoelectric material layer 12, it is converted by the piezoelectric material layer 12 into an AC voltage signal, and the lower electrode 11 receives an output signal (the upper electrode 10 is grounded and the lower electrode 11 is a receiving end), so as to collect the AC voltage signal. Different energy levels are reflected by valleys and ridges of the fingerprint 13, i.e., a signal acquired through reflecting the acoustic wave by the valley is stronger and a signal acquired through reflecting the acoustic wave by the ridge is weaker, so it is able to determine the valleys and the ridges in accordance with the AC voltage signal formed through the valleys and the AC voltage signal formed through the ridges, thereby to recognize the fingerprint 13.

Figure 3:
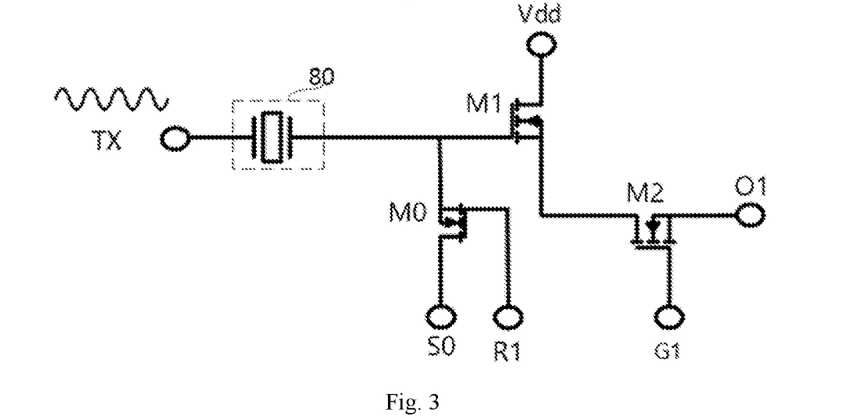
FIG. 3 is a circuit diagram of a pixel circuit in the conventional ultrasonic fingerprint sensor.

FIG. 3 shows a circuit diagram of a pixel circuit in the conventional ultrasonic fingerprint sensor. As shown in FIG. 3, the pixel circuit in the conventional ultrasonic fingerprint sensor includes a piezoelectric element 80, a first switching transistor M0, a second switching transistor M1 and a third switching transistor M2. The piezoelectric element 80 includes a piezoelectric material layer, an upper electrode arranged at one side of the piezoelectric material layer, and a lower electrode arranged at the other side of the piezoelectric material layer. The upper electrode is electrically coupled to a signal input end TX, and the lower electrode is electrically coupled to a gate electrode of the second switching transistor M1. A gate electrode of the first switching transistor M0 is electrically coupled to a resetting end R1, a first electrode of a first switching transistor M0 is electrically coupled to a sampling signal end S0, and a second electrode of the first switching transistor M0 is electrically coupled to the gate electrode of the second switching transistor M1, a first electrode of the second switching transistor M1 is electrically coupled to a power source voltage end Vdd, a second electrode of the second switching transistor M1 is electrically coupled to a first electrode of the third switching transistor M2, a second electrode of the third switching transistor M2 is electrically coupled to a signal output end O1, and a gate electrode of the third switching transistor M2 is electrically coupled to a scanning control end G1.

In the circuit diagram of the pixel circuit in the conventional ultrasonic fingerprint sensor shown in FIG. 3, M0, M1, and M2 are, but not limited to, TFTs or metal-oxide-semiconductor field effect transistors.

As shown in FIG. 3, when the AC voltage signal received by the signal input end TX is a sinusoidal signal, after the signal input end TX stops receiving the sinusoidal signal, the piezoelectric material layer cannot be stationary immediately due to the mechanical inertia, so the signal applied to the signal input end TX does not return to zero immediately, and an amplitude of the signal applied to the signal input end TX gradually decreases due to residual vibration of the piezoelectric material layer.

A time period from a time when the signal input end TX stops receiving the sinusoidal signal to a time when the sampling signal end S0 starts to receive the signal is a signal delay period, and there is the residual vibration of the piezoelectric material layer within the signal delay period. It is found that, within the signal delay period, at a certain time close to the time when the signal input end TX stops receiving the sinusoidal signal, the echo signal reflected by the fingerprint 13 to the piezoelectric material layer is the strongest. However, at this time, the residual vibration still occurs for the piezoelectric material layer, and a resultant coupling noise is relatively large, so a signal-to-noise ratio of the received signal is seriously adversely affected due to the introduced noise.

An object of the present disclosure is to provide a fingerprint sensing sub-circuit, a fingerprint sensing circuit and a sensor, so as to solve the above-mentioned problem.

The present disclosure will be described hereinafter in details in conjunction with the drawings.

Figure 4:
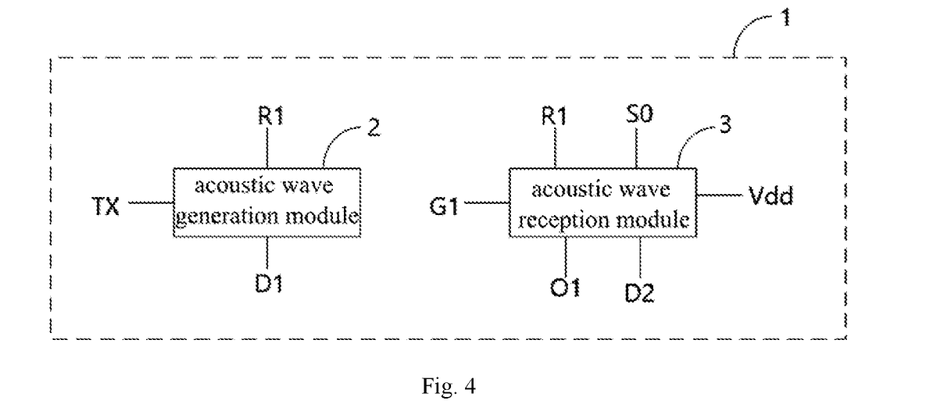
FIG. 4 is a schematic view of a fingerprint sensing sub-circuit according to one embodiment of the disclosure.

The present disclosure provides in some embodiments a fingerprint sensing sub-circuit which, as shown in FIG. 4, includes an acoustic wave generation circuit 2 and an acoustic wave reception circuit 3. The acoustic wave generation circuit 2 is electrically coupled to a signal input end TX, a resetting end R1 and a first voltage end D1, and configured to receive an alternating current signal from the signal input end TX, and generate an ultrasonic wave in accordance with the alternating current signal from the signal input end TX under the control of a resetting signal from the resetting end R1. The acoustic wave reception circuit 3 is electrically coupled to a second voltage end D2, the resetting end R1, a sampling signal end S0, a power source voltage end Vdd, a scanning control end G1 and a signal output end O1, and configured to convert an echo signal formed after the ultrasonic wave is reflected by a fingerprint into a voltage signal and output the voltage signal to the signal output end O1, or convert the voltage signal into a current signal and output the current signal to the signal output end O1 under the control of the resetting signal from the resetting end R1, a sampling signal from the sampling signal end S0, and a scanning control signal from the scanning control end G1.

In FIG. 4, 1 represents the fingerprint sensing sub-circuit.

It should be appreciated that, the acoustic wave generation circuit 2 in at least one embodiment of the present disclosure includes a piezoelectric material layer, so as to convert the alternating current signal from the signal input end TX into an acoustic wave signal under the control of the alternating current signal and the resetting signal from the resetting end R1, thereby to generate the acoustic wave. The acoustic wave reception circuit 3 also includes a piezoelectric material layer, so as to convert the received echo signal formed after the ultrasonic wave is reflected by the fingerprint into the voltage signal, and collect the voltage signal under the control of the resetting signal from the resetting end R1 and the sampling signal from the sampling signal end S0. A specific arrangement mode of the piezoelectric material layer will be introduced hereinafter.

In at least one embodiment of the present disclosure, both the first voltage end and the second voltage end are, but not limited to, ground ends.

It should be appreciated that, in at least one embodiment of the present disclosure, although the voltage signal is directly outputted to the signal output end O1 and the fingerprint is recognized by detecting the voltage signal, in actual design, large attenuation occurs for the voltage signal when the voltage signal is transmitted to a detection circuit (the detection circuit, for example, is an integrated circuit), and it is also affected by the other signals, so a detection result will be adversely affected. Hence, the following description will be given merely when the voltage signal is converted into the current signal and the current signal is outputted to the signal output end O1.

In at least one embodiment of the present disclosure, the acoustic wave generation circuit 2 and the acoustic wave reception circuit 3 in the fingerprint sensing sub-circuit are separated from each other, and the acoustic wave reception circuit 3 is electrically coupled to the second voltage end D2, so after the acoustic wave generation circuit 2 has received the AC signal from the signal input end TX, the acoustic wave reception circuit 3 will not be adversely affected. As compared with the related art, in the embodiments of the present disclosure, through an operating mode where a transmitting operation and a receiving operation are separated from each other, it is able to effectively eliminate a coupling noise introduced by the residual vibration of the piezoelectric material layer. In addition, in the embodiments of the present disclosure, within the signal delay period, a time is selected in such a manner as to be closer to the time when the signal input end TX stops receiving the AC signal, so it is able to collect a maximum amount of signals more flexibly without taking the coupling noise into consideration, thereby to effectively improve the signal-to-noise ratio.

In a possible embodiment of the present disclosure, the acoustic wave generation circuit includes an electro-acoustic conversion control circuit and an electro-acoustic conversion circuit.

The electro-acoustic conversion control circuit is electrically coupled to the electro-acoustic conversion circuit, the resetting end and the first voltage end, and configured to enable the electro-acoustic conversion circuit to be electrically coupled to the first voltage end under the control of the resetting signal.

The electro-acoustic conversion circuit is electrically coupled to the signal input end and the electro-acoustic conversion control circuit, and configured to receive the alternating current signal from the signal input end, and convert the alternating current signal into the ultrasonic wave when the electro-acoustic conversion circuit is electrically coupled to the first voltage end.

Figure 5:
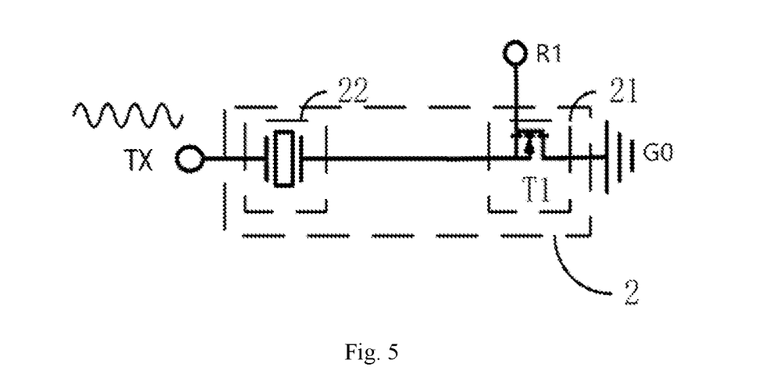
FIG. 5 is a circuit diagram of an acoustic wave generation circuit in the fingerprint sensing sub-circuit according to one embodiment of the present disclosure.

As shown in FIG. 5, in at least one embodiment of the present disclosure, the acoustic wave generation circuit 2 includes an electro-acoustic conversion control circuit 21 and an electro-acoustic conversion circuit 22. The electro-acoustic conversion control circuit 21 is electrically coupled to the electro-acoustic conversion circuit 22, the resetting end R1, and a ground end G0, and configured to enable the electro-acoustic conversion circuit 22 to be grounded under the control of the resetting signal from the resetting end R1. The electro-acoustic conversion circuit 22 is electrically coupled to the signal input end TX and the electro-acoustic conversion control circuit 21, and configured to receive the alternating current signal from the signal input end TX, and convert the alternating current signal into the ultrasonic wave when the electro-acoustic conversion circuit 22 is grounded.

Hence, when the ultrasonic wave needs to be generated, the acoustic wave generation circuit 2 in FIG. 5 inputs the alternating current signal through the signal input end TX, and generates the ultrasonic wave by controlling the electro-acoustic conversion circuit 22 to be grounded. The acoustic wave generation circuit 2 is not used to receive the ultrasonic wave, so as to achieve the operating mode where the transmitting operation and the receiving operation are separated from each other.

In at least one embodiment of the present disclosure, as shown in FIG. 5, the first voltage end is the ground end G0.

In a possible embodiment of the present disclosure, with reference to FIG. 5 again, the electro-acoustic conversion control circuit 21 includes a first transistor T1. A control electrode of the first transistor T1 is electrically coupled to the resetting end R1, a first electrode of the first transistor T1 is electrically coupled to the electro-acoustic conversion circuit 22, and a second electrode of the first transistor T1 is electrically coupled to the ground end G0. The control electrode of the first transistor T1 is a gate electrode, the first electrode of the first transistor T1 is a source electrode or a drain electrode, and the second electrode of the first transistor T1 is a drain electrode or a source electrode. In actual design, the positions of the source electrode and the drain electrode are capable of being interchanged.

When the first transistor T1 is turned on under the control of the resetting signal from the resetting end R1, one end of the electro-acoustic conversion circuit 22 is grounded, and the other end of the electro-acoustic conversion circuit 22 is electrically coupled to the signal input end TX. As this time, it is equivalent to applying an alternating current signal to the electro-acoustic conversion circuit 22. During the implementation, the electro-acoustic conversion circuit 22 includes a piezoelectric material layer. After an alternating current signal has been applied to the piezoelectric material layer in the electro-acoustic conversion circuit 22, the piezoelectric material layer vibrates and generates an ultrasonic wave, so as to cover an electric signal into an acoustic signal.

In at least one embodiment of the present disclosure, the acoustic wave reception circuit includes an acoustic-electrical conversion circuit, a sampling control circuit, a signal conversion circuit and an output control circuit.

The acoustic-electric conversion circuit is electrically coupled to the second voltage end, the sampling control circuit and the signal conversion circuit, and configured to receive an echo signal after the ultrasonic wave is reflected by a fingerprint, and convert the echo signal into a voltage signal.

The sampling control circuit is electrically coupled to the resetting end, the sampling signal end, the acoustic-electric conversion circuit and the signal conversion circuit, and configured to output the voltage signal to the signal conversion circuit under the control of the resetting signal and the sampling signal.

The signal conversion circuit is electrically coupled to the sampling control circuit, the power source voltage end and the output control circuit, and configured to convert the voltage signal into a current signal, and output the current signal to the output control circuit.

The output control circuit is electrically coupled to the signal conversion circuit, the scanning control end and the signal output end, and configured to output the current signal to the signal output under the control of the scanning control signal.

Figure 6:
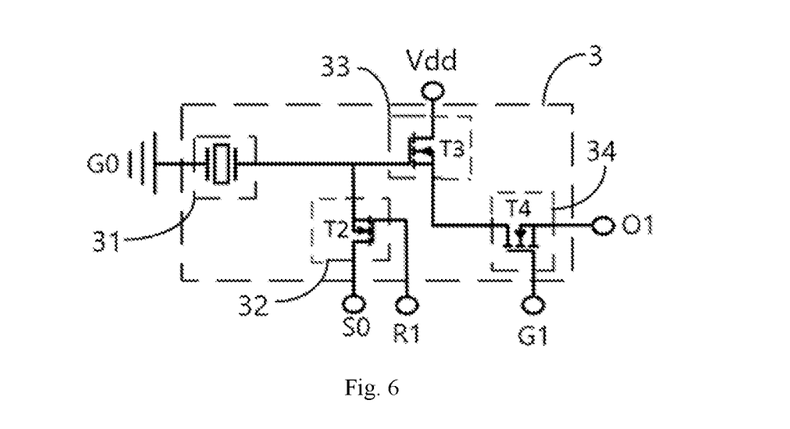
FIG. 6 is a circuit diagram of an acoustic wave reception circuit in the fingerprint sensing sub-circuit according to one embodiment of the present disclosure.

In a possible embodiment of the present disclosure, as shown in FIG. 6, the acoustic wave reception circuit 3 includes an acoustic-electrical conversion circuit 31, a sampling control circuit 32, a signal conversion circuit 33 and an output control circuit 34. The acoustic-electric conversion circuit 31 is electrically coupled to a ground end G0, the sampling control circuit 32 and the signal conversion circuit 33, and configured to receive an echo signal formed after the ultrasonic wave is reflected by a fingerprint, and convert the echo signal into a voltage signal. The sampling control circuit 32 is electrically coupled to the resetting end R1, the sampling signal end S0, the acoustic-electric conversion circuit 31 and the signal conversion circuit 33, and configured to output the voltage signal to the signal conversion circuit 33 under the control of the resetting signal from the resetting end R1 and the sampling signal from the sampling signal end S0. The signal conversion circuit 33 is electrically coupled to the sampling control circuit 32, the power source voltage end Vdd and the output control circuit 34, and configured to convert the voltage signal into a current signal, and output the current signal to the output control circuit 34. The output control circuit 34 is electrically coupled to the signal conversion circuit 33, the scanning control end G1 and the signal output end O1, and configured to output the current signal to the signal output end O1 under the control of the scanning control signal from the scanning control end G1.

Hence, when the ultrasonic wave needs to be received, the acoustic-electric conversion circuit 31 in the acoustic wave reception circuit 3 in FIG. 6 is electrically coupled to the ground end G0. As compared with the related art, the acoustic wave reception circuit 3 is not electrically coupled to the signal input end TX, so as to achieve the operating mode where the transmitting operation and the receiving operation are separated from each other.

In a possible embodiment of the present disclosure, with reference to FIG. 6 again, the sampling control circuit 32 includes a second transistor T2. A control electrode of the second transistor T2 is electrically coupled to the resetting end R1, a first electrode of the second transistor T2 is electrically coupled to the acoustic-electric conversion circuit 31 and the signal conversion circuit 33, and a second electrode of the second transistor T2 is electrically coupled to the sampling signal end S0. The control electrode of the second transistor T2 is a gate electrode, the first electrode of the second transistor T2 is a source electrode or a drain electrode, and the second electrode of the second transistor T2 is a drain electrode or a source electrode. In actual design, the positions of the source electrode and drain electrode are capable of being interchanged.

In a possible embodiment of the present disclosure, as shown in FIG. 6, the signal conversion circuit 33 includes a third transistor T3. A control electrode of the third transistor T3 is electrically coupled to the first electrode of the second transistor T2, a first electrode of the third transistor T3 is electrically coupled to the power source voltage end Vdd, and a second electrode of the third transistor T3 is electrically coupled to the output control circuit 34. The control electrode of the third transistor T3 is a gate electrode; the first electrode of the third transistor T3 is a source electrode or a drain electrode, and the second electrode of the third transistor T3 is a drain electrode or a source electrode. In actual design, the positions of the source electrode and drain electrode are capable of being interchanged.

In a possible embodiment of the present disclosure, as shown in FIG. 6, the output control circuit 34 includes a fourth transistor T4. A control electrode of the fourth transistor T4 is electrically coupled to the scanning control end G1, a first electrode of the fourth transistor T4 is electrically coupled to the second electrode of the third transistor T3, and a second electrode of the fourth transistor T4 is electrically coupled to the signal output end O1. The control electrode of the fourth transistor T4 is a gate electrode; the first electrode of the fourth transistor T4 is a source electrode or a drain electrode, and the second electrode of the fourth transistor T4 is a drain electrode or a source electrode. In actual design, the positions of the source electrode and drain electrode are capable of being interchanged.

In a possible embodiment of the present disclosure, in FIG. 5 and FIG. 6, T1, T2, T3, and T4 are, but not limited to, n-type transistors.

In a possible embodiment of the present disclosure, as shown in FIG. 5 and FIG. 6, the first transistor T1, the second transistor T2, the third transistor T3, and the fourth transistor T4 in at least one embodiment of the present disclosure are all, but not limited to, TFTs, or the first transistor T1, the second transistor T2, the third transistor T3, and the fourth transistor T4 are all, but not limited to, metal-oxide-semiconductor field effect transistors.

In at least one embodiment of the present disclosure, the acoustic-electric conversion circuit 31 includes a piezoelectric material layer, so as to convert the echo signal formed after the ultrasonic wave is reflected by the fingerprint into a voltage signal.

Figure 7:
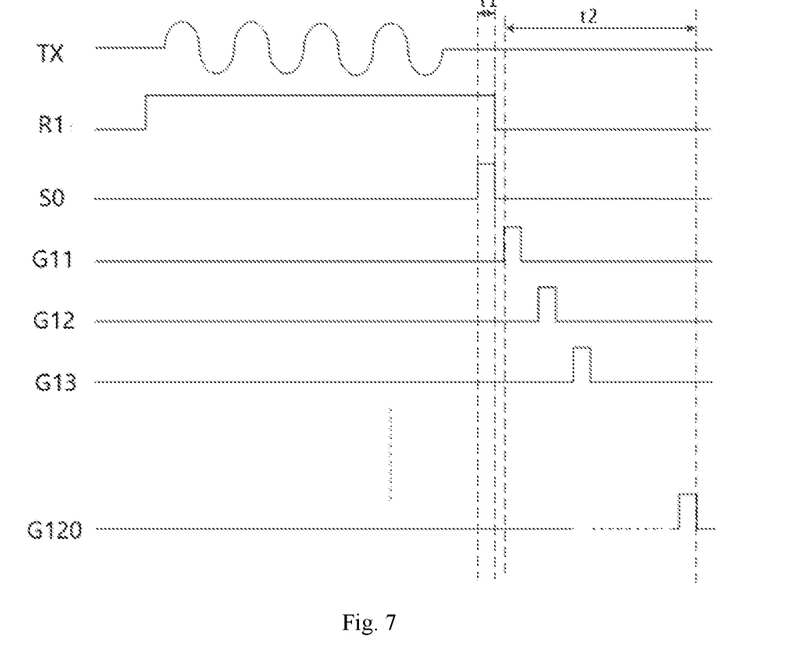
FIG. 7 is a sequence diagram of the fingerprint sensing sub-circuit according to one embodiment of the present disclosure.
Figure 8:
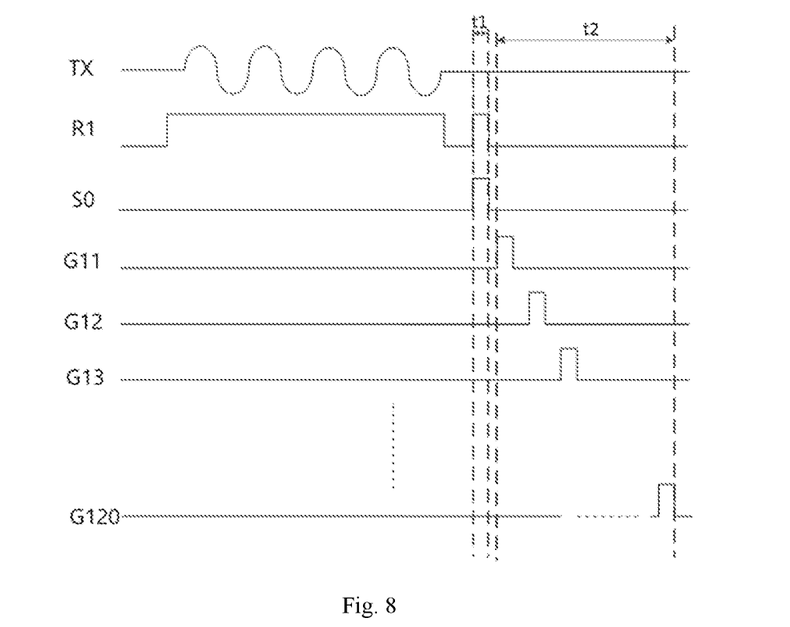
FIG. 8 is another sequence diagram of the fingerprint sensing sub-circuit according to one embodiment of the present disclosure.

FIG. 7 shows a sequence diagram of the fingerprint sensing sub-circuit according to one embodiment of the present disclosure, and FIG. 8 shows another sequence diagram of the fingerprint sensing sub-circuit according to one embodiment of the present disclosure. A difference between FIG. 7 and FIG. 8 lies in that, in FIG. 7, the resetting signal from the resetting end R1 is a high level signal within the signal delay period, while in FIG. 8, the resetting signal from the resetting end R1 is a low level signal within the signal delay period. The fingerprint sensing sub-circuit in the embodiments of the present disclosure is capable of operating in the mode where the transmitting operation and the receiving operation are separated from each other, so the fingerprint sensing sub-circuit operates normally in the case of both the sequence diagram in FIG. 7 and the sequence diagram in FIG. 8. A specific operating process of the fingerprint sensing sub-circuit will be described hereinafter in details.

Based on a same inventive concept, the present disclosure provides in some embodiments a fingerprint sensing circuit, which includes a plurality of resetting signal lines extending in a first direction, a plurality of sampling signal lines extending in the first direction, a plurality of signal reading lines extending in the first direction, a plurality of scanning signal lines extending in a second direction, and a plurality of the above-mentioned fingerprint sensing sub-circuits arranged in an array form.

Each fingerprint sensing sub-circuit corresponds to a resetting end, a sampling signal end, a signal output end, a scanning control end, the resetting signal line, the sampling signal line, the signal reading line and the scanning signal line.

Each fingerprint sensing sub-circuit is electrically coupled to a corresponding resetting signal line through a corresponding resetting end, electrically coupled to a corresponding sampling signal line through a corresponding sampling signal end, electrically coupled to a corresponding signal reading line through a corresponding signal output end, and electrically coupled to a corresponding scanning signal line through a corresponding scanning control end.

In at least one embodiment of the present disclosure, the first direction intersects the second direction.

Figure 9:
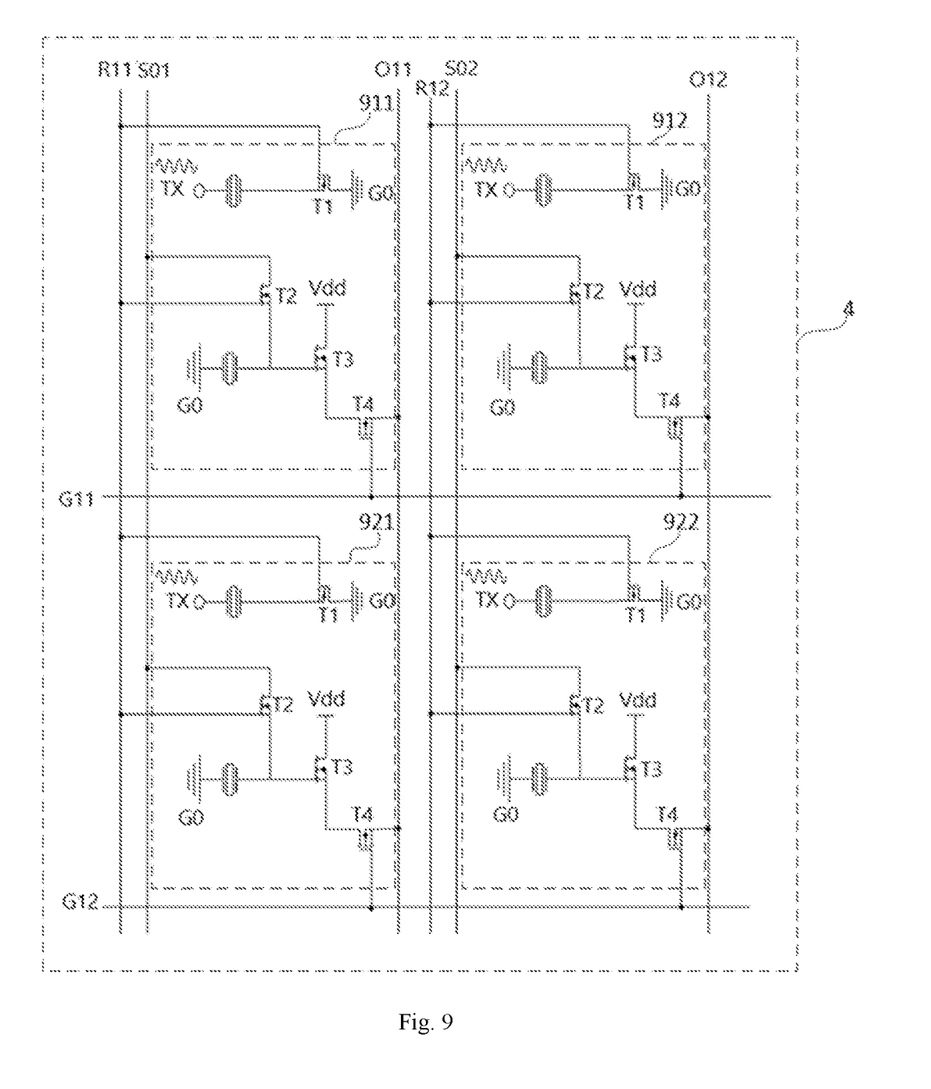
FIG. 9 is a circuit diagram of a fingerprint sensing circuit according to one embodiment of the present disclosure.

FIG. 9 is a circuit diagram of the fingerprint sensing circuit. FIG. 9 merely shows two resetting signal lines, two sampling signal lines, two signal reading lines, two scanning signal lines, and the fingerprint sensing sub-circuits in two rows and two columns, so as to illustratively show a connection relationship between each fingerprint sensing sub-circuit and the signal lines.

As shown in FIG. 9, the first direction is, but not limited to, a vertical direction, and the second direction is, but not limited to, a horizontal direction.

In FIG. 9, 4 represents the fingerprint sensing circuit.

In FIG. 9, R11 represents a first resetting signal line, R12 represents a second resetting signal line, S01 represents a first sampling signal line, S02 represents a second sampling signal line, O11 represents a first signal reading line, O12 represents a second signal reading line, G11 represents a first scanning signal line, G12 represents a second scanning signal line, 911 represents a fingerprint sensing sub-circuit in a first row and a first column, 912 represents a fingerprint sensing sub-circuit in the first row and a second column, 921 represents a fingerprint sensing sub-circuit in a second row and the first column, and 922 represents a fingerprint sensing sub-circuit in the second row and second column.

As shown in FIG. 9, the fingerprint sensing sub-circuit 911 in the first row and the first column corresponds to R11, S01, O11 and G11, the fingerprint sensing sub-circuit 912 in the first row and the second column corresponds to R12, S02, O12 and G11, the fingerprint sensing sub-circuit 921 in the second row and first column corresponds to R11, S01, O11 and G12, and the fingerprint sensing sub-circuit 922 in the second row and second column corresponds to R12, S02, O12 and G12.

As shown in FIG. 9, the fingerprint sensing sub-circuit 911 in the first row and the first column is electrically coupled to R11 through a corresponding resetting end, electrically coupled to S01 through a corresponding sampling signal end, electrically coupled to O11 through a corresponding signal output end, and electrically coupled to G11 through a corresponding scanning control end.

The fingerprint sensing sub-circuit 912 in the first row and second column is electrically coupled to R12 through a corresponding resetting end, electrically coupled to S02 through a corresponding sampling signal end, electrically coupled to O12 through a corresponding signal output end, and electrically coupled to G11 through a corresponding scanning control end.

The fingerprint sensing sub-circuit 921 in the second row and the first column is electrically coupled to R11 through a corresponding resetting end, electrically coupled to S01 through a corresponding sampling signal end, electrically coupled to O11 through a corresponding signal output end, and electrically coupled to G12 through a corresponding scanning control end.

The fingerprint sensing sub-circuit 922 in the second row and second column is electrically coupled to R12 through a corresponding resetting end, electrically coupled to S02 through a corresponding sampling signal end, electrically coupled to O12 through a corresponding signal output end, and electrically coupled to G12 through a corresponding scanning control end.

As shown in FIG. 9, adjacent scanning signal lines and adjacent resetting signal lines define a circuit region, and the fingerprint sensing sub-circuit is located in the circuit region.

Hence, in the fingerprint sensing circuit as shown in FIG. 9, the acoustic wave generation circuit and the acoustic wave reception circuit are separated from each other and are not coupled to each other. The fingerprint sensing circuit operates in an operating mode where a transmitting operation and a receiving operation are separated from each other, so it is able to improve a signal-to-noise ratio.

FIG. 9 merely shows the fingerprint sensing sub-circuits in two rows and two columns. In actual use, the fingerprint sensing circuit includes the fingerprint sensing sub-circuits in a plurality of rows and a plurality of columns.

A specific operating procedure of the fingerprint sensing circuit will be described hereinafter with reference to FIGS. 5 to 9.

As shown in FIG. 7 and FIG. 8, a waveform corresponding to TX is a waveform of a signal received by the signal input end TX, a waveform corresponding to R1 is a waveform diagram of a signal received by the resetting end R1, a waveform corresponding to S0 is a waveform of a signal received by the sampling signal end S0, a waveform corresponding to G11 is a waveform of a signal received by a first scanning signal line G11, a waveform corresponding to G12 is a waveform of a signal received by a second scanning signal line G12, a waveform corresponding to G13 is a waveform of a signal received by a third scanning signal line G13, and a waveform corresponding to G120 is a waveform of a signal received by a twentieth scanning signal line G120. The description is given when there are totally 20 scanning signal lines.

As shown in FIG. 7 and FIG. 8, within a time period where the ultrasonic wave is emitted, the resetting end R1 outputs a high-level signal, the signal input end TX receives a sinusoidal signal, and the sampling signal end S0 and the scanning control end G1 both output low-level signals, as shown in FIG. 5 and FIG. 9. The first transistor T1 is turned on, one end of the electro-acoustic conversion circuit 22 is electrically coupled to the signal input end TX, and the other end is grounded. At this time, the electro-acoustic conversion circuit 22 converts an electric signal with a sinusoidal waveform into an ultrasonic wave and emits it toward the fingerprint.

As shown in FIGS. 7 and 8, within a time period where the ultrasonic wave is received, the acoustic-electric conversion circuit 31 receives the echo signal formed after the ultrasonic wave is reflected by the fingerprint, and converts the echo signal into a voltage signal. The signal input end TX does not receive the electric signal with the sinusoidal waveform any more. In this way, it is able to provide the operating mode where the transmitting operation and the receiving operation are separated from each other. The time period where the ultrasonic wave is received includes a signal collection time period and a signal output time period.

Specifically, as shown in FIGS. 7 and 8, within the signal collection time period t1, the resetting end R1 and the sampling signal end S0 both output a high-level signal, and each scanning signal line outputs a low-level signal. As shown in FIGS. 6 and 9, the second transistor T2 is turned on, and the fourth transistor T4 is turned off. A potential at the gate electrode of the third transistor T3 is pulled up due to the high-level signal from the sampling signal end S0, so that T3 is turned on. At this time, one end of the acoustic-electric conversion circuit 31 is grounded, and the other end of the acoustic-electric conversion circuit 31 receives a high level. The acoustic-electric conversion circuit 31 receives the echo signal formed after the ultrasonic wave is reflected by the fingerprint, and converts the echo signal into a voltage signal. The voltage signal converted by the acoustic-electric conversion circuit 31 is applied to the third transistor T3. The third transistor T3 is a voltage-controlled current-type device. In addition to serving as a switch, it is also capable of converting the voltage signal acquired by the acoustic-electric conversion circuit 31 into a current signal (current signals corresponding to different voltage signals have different intensities), and outputting the current signal to the fourth transistor T4. The fourth transistor T4 is turned off within the signal collection time period, so the current signal is not detected at the signal output end O1.

As shown in FIG. 7 and FIG. 8, within the signal output time period t2, the resetting end R1 and the sampling signal end S0 both output a low-level signal, and G11 to G120 output a high-level signal in turn. When a corresponding scanning signal line outputs a high-level signal, the fourth transistor T4 in the fingerprint sensing sub-circuit in a corresponding row is turned on. As shown in FIG. 6 and FIG. 9, within the signal output time period t2, the second transistor T2 and the third transistor T3 are turned off. When the gate electrode of the fourth transistor T4 receives a high-level signal, the fourth transistor T4 is turned on. At this time, the current signal is applied to a corresponding signal output end O1 through the fourth transistor T4. The signal output end O1 is electrically coupled to an integrated circuit. Through the integrated circuit, the current signal is amplified and then detected to complete the fingerprint recognition. A specific fingerprint recognition process is similar to that known in the art, and thus will not be particularly defined herein.

Figure 10:
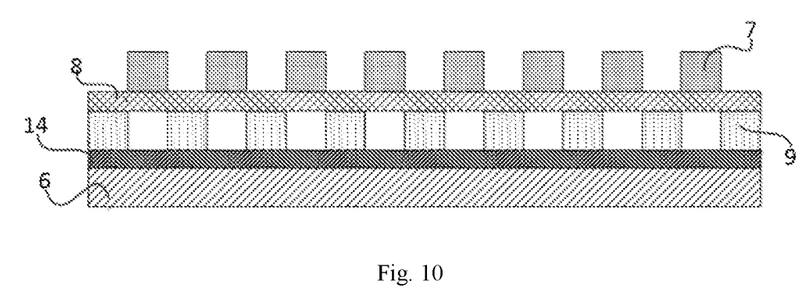
FIG. 10 is a schematic view of a sensor according to one embodiment of the present disclosure.

Based on a same inventive concept, as shown in FIG. 10, the present disclosure provides in some embodiments a sensor, which includes a substrate 6, and the above-mentioned fingerprint sensing circuit arranged on the substrate 6. The sensor includes the above-mentioned fingerprint sensing circuit, so it has the same beneficial effects as the above-mentioned fingerprint sensing circuit, which will thus not be particularly defined herein.

In a possible embodiment of the present disclosure, as shown in FIG. 10, the fingerprint sensing circuit includes a circuit control layer 14 arranged on the substrate 6. The fingerprint sensing circuit 4 includes a plurality of fingerprint sensing sub-circuits arranged in an array form, and each fingerprint sensing sub-circuit includes an electro-acoustic conversion control circuit, an electro-acoustic conversion circuit, an acoustic-electric conversion circuit, a sampling control circuit, a signal conversion circuit and an output control circuit. The electro-acoustic conversion circuit includes a first electrode 7 and a piezoelectric layer 8, and the acoustic-electric conversion circuit includes a second electrode 9 and a piezoelectric layer 8. The electro-acoustic conversion control circuit, the sampling control circuit, the signal conversion circuit and the output control circuit are arranged at the circuit control layer 14. The second electrode 9 is arranged at a side of the circuit control layer 14 away from the substrate 6, the piezoelectric layer 8 is arranged at a side of the second electrode 9 away from the substrate 6, and the first electrode 7 is arranged at a side of the piezoelectric layer 8 away from the second electrode 9.

In at least one embodiment of the present disclosure, the piezoelectric layer 8 is just a piezoelectric material layer.

In a possible embodiment of the present disclosure, the first transistor T1, the second transistor T2, the third transistor T3 and the fourth transistor T4 are all arranged on the circuit control layer 14. A specific manufacturing method of the first transistor T1, the second transistor T2, the third transistor T3 and the fourth transistor T4 is similar to that known in the art, and thus will not be particularly defined herein.

Figure 11:
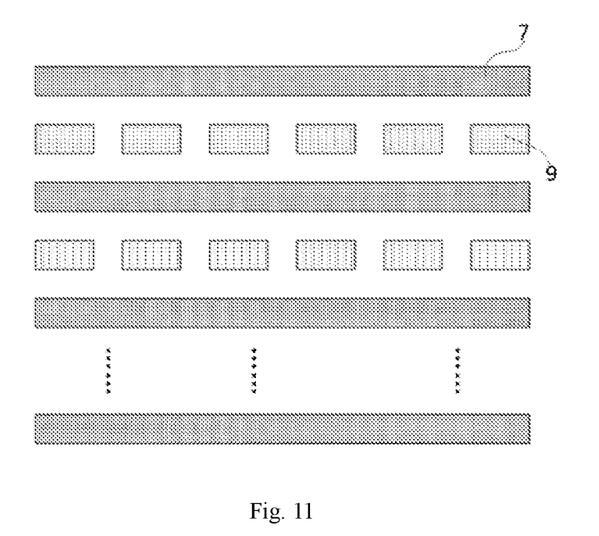
FIG. 11 is a top view of a first electrode and a second electrode according to one embodiment of the present disclosure.
Figure 12:
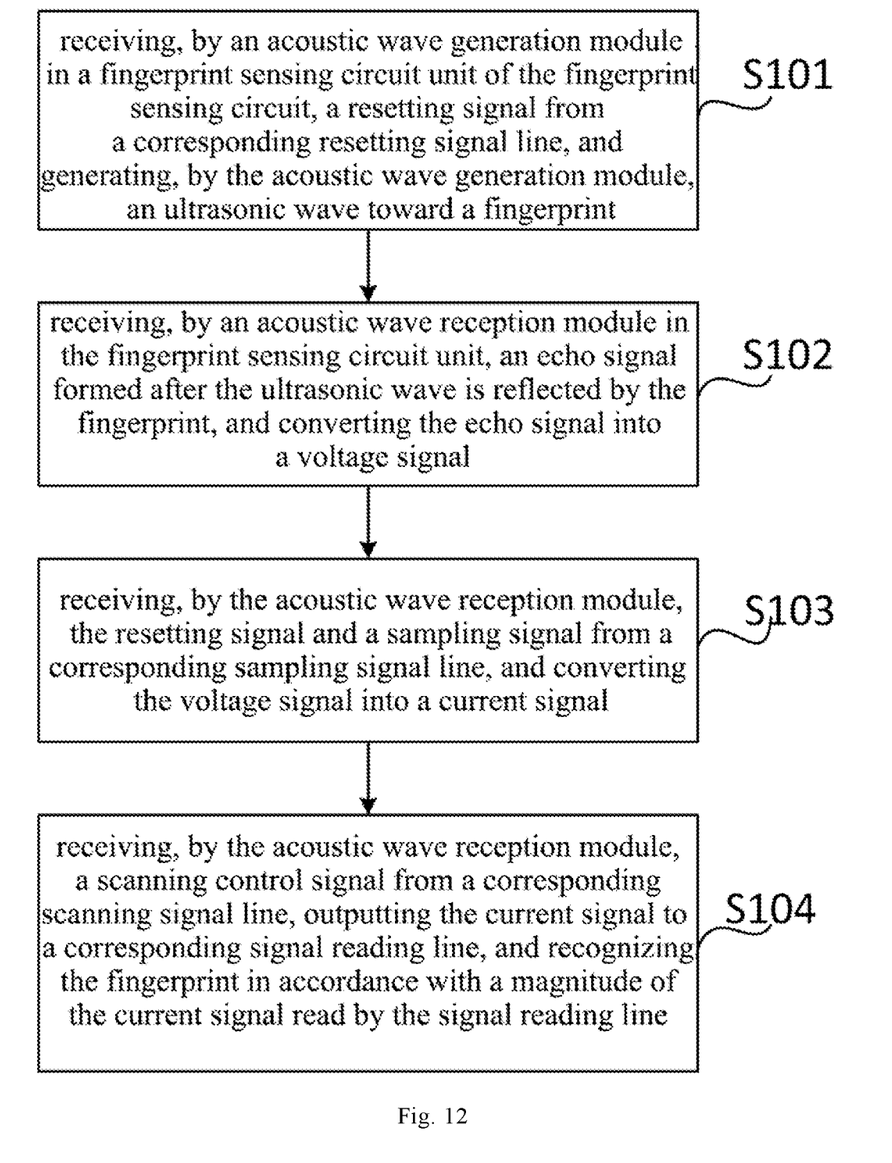
FIG. 12 is a flow chart of a fingerprint recognition method according to one embodiment of the present disclosure.

In a possible embodiment of the present disclosure, as shown in FIG. 10 and FIG. 11, the first electrode 7 is a strip-like electrode, and the second electrode 8 is a block-like electrode. An orthogonal projection of the first electrode 7 onto the substrate 6 does not overlap an orthogonal projection of the second electrode 9 onto the substrate 6.

In at least one embodiment of the present disclosure, a size of the second electrode 9 is the same or approximately the same as a size of the fingerprint sensing sub-circuit. When the sensor in the embodiments of the present disclosure is arranged on or built in a display panel, a position of each second electrode 9 corresponds to a position of one fingerprint sensing sub-circuit. In at least one embodiment of the present disclosure, the first electrode 7 and the second electrode 9 are respectively arranged at opposite sides of the piezoelectric layer 8, and the orthogonal projection of the first electrode 7 onto the substrate 6 does not overlap the orthogonal projection of the second electrode 9 onto the substrate 6. Each of the first electrode 7 and the second electrode 9 is divided in space, so as to reduce an attenuation level of the ultrasonic wave to the piezoelectric layer 8. Of course, in actual design, the first electrode 7 also covers an entire surface of the substrate 6, that is, the orthogonal projection of the first electrode 7 onto the substrate 6 covers the substrate 6. The shapes of the first electrode 7 and the second electrode 9 will not be particularly defined herein.

In a possible embodiment of the present disclosure, the piezoelectric layer 8 has a strip-like shape, or an orthogonal projection of the piezoelectric layer 8 onto the substrate 6 covers the substrate 6, that is, the piezoelectric layer 8 is of a planar shape. A specific shape of the piezoelectric layer 8 will not be particularly defined herein, and the piezoelectric layer 8 is also of a block-like shape. The present disclosure does not focus on specific structures of the first electrode 7, the second electrode 9 and the piezoelectric layer 8, which will thus not be particularly defined herein.

Based on a same inventive concept, the present disclosure provides in some embodiments a touch display panel, which includes a display panel and the above-mentioned sensor. The sensor is arranged on or built in the display panel. The touch display panel includes the above-mentioned sensor, so it has the same beneficial effects as the above-mentioned sensor, which will thus not be particularly defined herein.

In a possible embodiment of the present disclosure, the display panel includes a plurality of sub-pixel units arranged in an array form, and a position of each fingerprint sensing sub-circuit corresponds to a position of one sub-pixel unit. In at least one embodiment of the present disclosure, the sensor is arranged on, or built in, the display panel, similar to that known in the related art. The present disclosure does not focus on the specific structure and specific setting mode thereof, which will thus not be particularly defined herein.

Based on a same inventive concept, the present disclosure provides in some embodiments a display device which includes the above-mentioned touch display panel. The display device includes the above-mentioned touch display panel, so it has the same beneficial effects as the above-mentioned touch display panel, which will thus not be particularly defined herein.

Based on a same inventive concept, the present disclosure provides in some embodiments a fingerprint recognition method for the above-mentioned fingerprint sensing circuit, which includes: S101 of receiving, by an acoustic wave generation circuit in a fingerprint sensing sub-circuit of the fingerprint sensing circuit, a resetting signal from a corresponding resetting signal line, and generating, by the acoustic wave generation circuit, an ultrasonic wave toward a fingerprint; S102 of receiving, by an acoustic wave reception circuit in the fingerprint sensing sub-circuit, an echo signal formed after the ultrasonic wave is reflected by the fingerprint, and converting the echo signal into a voltage signal; S103 of receiving, by the acoustic wave reception circuit, the resetting signal and a sampling signal from a corresponding sampling signal line, and converting the voltage signal into a current signal; and S104 of receiving, by the acoustic wave reception circuit, a scanning control signal from a corresponding scanning signal line, outputting the current signal to a corresponding signal reading line, and recognizing the fingerprint in accordance with a magnitude of the current signal read by the signal reading line.

In a possible embodiment of the present disclosure, in S101, referring to FIG. 5, FIG. 7, FIG. 8 and FIG. 9, when the sensor provided with the above-mentioned fingerprint sensing circuit has sensed a user's finger, the first transistor T1 is turned on under the control of a resetting signal from a corresponding resetting signal, so one end of the piezoelectric layer 8 of the electro-acoustic conversion circuit 22 is grounded, and the other end of the piezoelectric layer 8 receives the AC voltage from the signal input end TX. As this time, the piezoelectric layer 8 is deformed and an ultrasonic wave is generated and transmitted to the finger.

Next, in S102, referring to FIG. 6, FIG. 7, FIG. 8 and FIG. 9, the acoustic wave reception circuit 3 receives the echo signal formed after the ultrasonic wave is reflected by the fingerprint through the acoustic-electric conversion circuit 31, and converts the echo signal into a voltage signal.

In S103, referring to FIG. 6, FIG. 7, FIG. 8 and FIG. 9, under the control of the resetting signal from the corresponding resetting signal line, the second transistor T2 is turned on, the sampling signal from the corresponding sampling signal line is received, the voltage signal is collected and transmitted to the third transistor T3, and then the voltage signal is converted into a current signal through the third transistor T3.

Finally, in S104, under the control of the scanning control signal from the corresponding scanning signal line, the fourth transistor T4 is turned on, the current signal is outputted from the signal output end to the corresponding signal reading line, and the fingerprint is recognized in accordance with a magnitude of the current signal read by the signal reading line.

The present disclosure has the following beneficial effects.

1. The acoustic wave generation circuit 2 and the acoustic wave reception circuit 3 in the fingerprint sensing sub-circuit are separated from each other, and the acoustic wave reception circuit 3 is electrically coupled to the second voltage end D2, so after the acoustic wave generation circuit 2 has received the AC signal from the signal input end TX, the acoustic wave reception circuit 3 will not be adversely affected. As compared with the related art, in the embodiments of the present disclosure, through an operating mode where a transmitting operation and a receiving operation are separated from each other, it is able to effectively eliminate a coupling noise introduced by the residual vibration of the piezoelectric material layer. In addition, in the embodiments of the present disclosure, within the signal delay period, a time is selected in such a manner as to be closer to the time when the signal input end TX stops receiving the AC signal, so it is able to collect a maximum amount of signals more flexibly without taking the coupling noise into consideration, thereby to effectively improve the signal-to-noise ratio 2. The first electrode 7 and the second electrode 9 are arranged at opposite sides of the piezoelectric layer 8 respectively, and the orthogonal projection of the first electrode 7 onto the substrate 6 does not overlap the orthogonal projection of the second electrode 9 onto the substrate 6. Hence, it is able to divide the first electrode 7 and the second electrode 9 in a space, thereby to reduce an attenuation level of the ultrasonic wave to the piezoelectric layer 8.

It should be appreciated that, steps, measures and schemes in various operations, methods and processes that have already been discussed in the embodiments of the present disclosure may be replaced, modified, combined or deleted. In a possible embodiment of the present disclosure, the other steps, measures and schemes in various operations, methods and processes that have already been discussed in the embodiments of the present disclosure may also be replaced, modified, rearranged, decomposed, combined or deleted. In another possible embodiment of the present disclosure, steps, measures and schemes in various operations, methods and processes that are known in the related art and have already been discussed in the embodiments of the present disclosure may also be replaced, modified, rearranged, decomposed, combined or deleted.

It should be further appreciated that, such words as "center", "on", "under", "front", "back", "left", "right", "vertical", "horizontal", "top", "bottom", "inner" and "outer" are used to indicate directions or positions as viewed in the drawings, and they are merely used to facilitate the description in the present disclosure, rather than to indicate or imply that a device or member must be arranged or operated at a specific position.

In addition, such words as "first" and "second" may merely be adopted to differentiate different features rather than to implicitly or explicitly indicate any number or importance, i.e., they may be adopted to implicitly or explicitly indicate that there is at least one said feature. Further, such a phrase as "a plurality of" may be adopted to indicate that there are two or more features, unless otherwise specified.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A fingerprint sensing sub-circuit, comprising an acoustic wave generation circuit and an acoustic wave reception circuit, wherein
the acoustic wave generation circuit is electrically coupled to a signal input end, a resetting end and a first voltage end, and configured to receive an alternating current signal from the signal input end, and generate an ultrasonic wave in accordance with the alternating current signal under the control of a resetting signal from the resetting end; and
the acoustic wave reception circuit is electrically coupled to a second voltage end, the resetting end, a sampling signal end, a power source voltage end, a scanning control end and a signal output end, and configured to convert an echo signal formed after the ultrasonic wave is reflected by a fingerprint into a voltage signal, and output the voltage signal to the signal output end, or convert the voltage signal into a current signal and output the current signal to the signal output end under the control of the resetting signal, a sampling signal from the sampling signal end and a scanning control signal from the scanning control end.

2. The fingerprint sensing sub-circuit according to claim 1, wherein the acoustic wave generation circuit comprises an electro-acoustic conversion control circuit and an electro-acoustic conversion circuit;
the electro-acoustic conversion control circuit is electrically coupled to the electro-acoustic conversion circuit, the resetting end and the first voltage end, and configured to enable the electro-acoustic conversion circuit to be electrically coupled to the first voltage end under the control of the resetting signal; and
the electro-acoustic conversion circuit is electrically coupled to the signal input end and the electro-acoustic conversion control circuit, and configured to receive the alternating current signal from the signal input end, and convert the alternating current signal into the ultrasonic wave when the electro-acoustic conversion circuit is electrically coupled to the first voltage end.

3. The fingerprint sensing sub-circuit according to claim 2, wherein the electro-acoustic conversion control circuit comprises a first transistor, wherein a control electrode of the first transistor is electrically coupled to the resetting end, a first electrode of the first transistor is electrically coupled to the electro-acoustic conversion circuit, and a second electrode of the first transistor is electrically coupled to the first voltage end.

4. The fingerprint sensing sub-circuit according to claim 1, wherein the acoustic wave reception circuit comprises an acoustic-electrical conversion circuit, a sampling control circuit, a signal conversion circuit and an output control circuit;
the acoustic-electric conversion circuit is electrically coupled to the second voltage end, the sampling control circuit and the signal conversion circuit, and configured to receive an echo signal formed after the ultrasonic wave is reflected by a fingerprint, and convert the echo signal into a voltage signal;
the sampling control circuit is electrically coupled to the resetting end, the sampling signal end, the acoustic-electric conversion circuit and the signal conversion circuit, and configured to output the voltage signal to the signal conversion circuit under the control of the resetting signal and the sampling signal;
the signal conversion circuit is electrically coupled to the sampling control circuit, the power source voltage end and the output control circuit, and configured to convert the voltage signal into a current signal and output the current signal to the output control circuit; and
the output control circuit is electrically coupled to the signal conversion circuit, the scanning control end and the signal output end, and configured to output the current signal to the signal output end under the control of the scanning control signal.

5. The fingerprint sensing sub-circuit according to claim 4, wherein the sampling control circuit comprises a second transistor, wherein a control electrode of the second transistor is electrically coupled to the resetting end, a first electrode of the second transistor is electrically coupled to the acoustic-electric conversion circuit and the signal conversion circuit, and a second electrode of the second transistor is electrically coupled to the sampling signal end.

6. The fingerprint sensing sub-circuit according to claim 5, wherein the signal conversion circuit comprises a third transistor, wherein a control electrode of the third transistor is electrically coupled to the first electrode of the second transistor, a first electrode of the third transistor is electrically coupled to the power source voltage end, and a second electrode of the third transistor is electrically coupled to the output control circuit.

7. The fingerprint sensing sub-circuit according to claim 6, wherein the output control circuit comprises a fourth transistor, wherein a control electrode of the fourth transistor is electrically coupled to the scanning control end, a first electrode of the fourth transistor is electrically coupled to the second electrode of the third transistor, and a second electrode of the fourth transistor is electrically coupled to the signal output end.

8. A fingerprint sensing circuit, comprising a plurality of resetting signal lines extending in a first direction, a plurality of sampling signal lines extending in the first direction, a plurality of signal reading lines extending in the first direction, a plurality of scanning signal lines extending in a second direction, and a plurality of the fingerprint sensing sub-circuits according to claim 1 arranged in an array form, wherein each fingerprint sensing sub-circuit corresponds to a resetting end, a sampling signal end, a signal output end, a scanning control end, the resetting signal line, the sampling signal line, the signal reading line, and the scanning signal line; and
 each fingerprint sensing sub-circuit is electrically coupled to a corresponding resetting signal line through a corresponding resetting end, electrically coupled to a corresponding sampling signal line through a corresponding sampling signal end, electrically coupled to a corresponding signal reading line through a corresponding signal output end, and electrically coupled to a corresponding scanning signal line through a corresponding scanning control end.

9. The fingerprint sensing circuit according to claim 8, wherein the fingerprint sensing sub-circuit comprises an acoustic wave generation circuit and an acoustic wave reception circuit, and the acoustic wave generation circuit comprises an electro-acoustic conversion control circuit and an electro-acoustic conversion circuit;
 the electro-acoustic conversion control circuit is electrically coupled to the electro-acoustic conversion circuit, the resetting end and the first voltage end, and configured to enable the electro-acoustic conversion circuit to be electrically coupled to the first voltage end under the control of the resetting signal; and
 the electro-acoustic conversion circuit is electrically coupled to the signal input end and the electro-acoustic conversion control circuit, and configured to receive the alternating current signal from the signal input end, and convert the alternating current signal into the ultrasonic wave when the electro-acoustic conversion circuit is electrically coupled to the first voltage end.

10. The fingerprint sensing circuit according to claim 9, wherein the acoustic wave reception circuit comprises an acoustic-electrical conversion circuit, a sampling control circuit, a signal conversion circuit and an output control circuit;
 the acoustic-electric conversion circuit is electrically coupled to the second voltage end, the sampling control circuit and the signal conversion circuit, and configured to receive an echo signal formed after the ultrasonic wave is reflected by a fingerprint, and convert the echo signal into a voltage signal;
 the sampling control circuit is electrically coupled to the resetting end, the sampling signal end, the acoustic-electric conversion circuit and the signal conversion circuit, and configured to output the voltage signal to the signal conversion circuit under the control of the resetting signal and the sampling signal;
 the signal conversion circuit is electrically coupled to the sampling control circuit, the power source voltage end and the output control circuit, and configured to convert the voltage signal into a current signal and output the current signal to the output control circuit; and
 the output control circuit is electrically coupled to the signal conversion circuit, the scanning control end and the signal output end, and configured to output the current signal to the signal output end under the control of the scanning control signal.

11. A sensor, comprising a substrate, and the fingerprint sensing circuit according to claim 8 arranged on the substrate.

12. The sensor according to claim 11, wherein the fingerprint sensing circuit comprises a circuit control layer arranged on the substrate;
 the fingerprint sensing sub-circuit comprises an electro-acoustic conversion control circuit, an electro-acoustic conversion circuit, an acoustic-electric conversion circuit, a sampling control circuit, a signal conversion circuit and an output control circuit;
 the electro-acoustic conversion circuit comprises a first electrode and a piezoelectric layer, and the acoustic-electric conversion circuit comprises a second electrode and a piezoelectric layer; and
 the electro-acoustic conversion control circuit, the sampling control circuit, the signal conversion circuit and the output control circuit are located at the circuit control layer, the second electrode is located at a side of the circuit control layer away from the substrate, the piezoelectric layer is located at a side of the second electrode away from the substrate, and the first electrode is located at a side of the piezoelectric layer away from the second electrode.

13. The sensor according to claim 12, wherein the first electrode is a strip-like electrode, the second electrode is a block-like electrode, and an orthogonal projection of the first electrode onto the substrate does not overlap an orthogonal projection of the second electrode onto the substrate.

14. The sensor according to claim 12, wherein the piezoelectric layer has a strip-like shape, or an orthogonal projection of the piezoelectric layer onto the substrate covers the substrate.

15. A touch display panel, comprising a display panel and the sensor according to claim 11, wherein the sensor is arranged on, or built in, the display panel.

16. A display device, comprising the touch display panel according to claim 15.

17. A fingerprint recognition method for the fingerprint sensing circuit according to claim 8, comprising:
 receiving, by an acoustic wave generation circuit in a fingerprint sensing sub-circuit of the fingerprint sensing circuit, a resetting signal from a corresponding resetting signal line, and generating, by the acoustic wave generation circuit, an ultrasonic wave toward a fingerprint;
 receiving, by an acoustic wave reception circuit in the fingerprint sensing sub-circuit, an echo signal formed after the ultrasonic wave is reflected by the fingerprint, and converting the echo signal into a voltage signal;
 receiving, by the acoustic wave reception circuit, the resetting signal and a sampling signal from a corresponding sampling signal line, and converting the voltage signal into a current signal; and receiving, by the acoustic wave reception circuit, a scanning control signal from a corresponding scanning signal line, outputting the current signal to a corresponding signal reading line, and recognizing the fingerprint in accordance with a magnitude of the current signal read by the signal reading line.

\* \* \* \* \*